(12) United States Patent
Cook (10) Patent No.: US 11,819,993 B2
(45) Date of Patent: *Nov. 21, 2023

(54) DEVICES AND METHODS FOR PASSING AN ITEM THROUGH AN OPENING

(71) Applicant: The Boeing Company, Chicago, IL (US)

(72) Inventor: Rebecca Cook, Ladson, SC (US)

(73) Assignee: The Boeing Company, Arlington, VA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/373,018

(22) Filed: Jul. 12, 2021

(65) Prior Publication Data

US 2021/0339377 A1 Nov. 4, 2021

Related U.S. Application Data

(62) Division of application No. 16/281,017, filed on Feb. 20, 2019, now Pat. No. 11,084,164.

(51) Int. Cl.
| | |
|---|---|
| *B25H 5/00* | (2006.01) |
| *B33Y 80/00* | (2015.01) |
| *B29C 64/393* | (2017.01) |
| *B64D 1/08* | (2006.01) |
| *B29L 31/00* | (2006.01) |
| *B33Y 50/02* | (2015.01) |

(52) U.S. Cl.
CPC ............. *B25H 5/00* (2013.01); *B29C 64/393* (2017.08); *B33Y 80/00* (2014.12); *B64D 1/08* (2013.01); *B29L 2031/768* (2013.01); *B33Y 50/02* (2014.12)

(58) Field of Classification Search
CPC . B64D 1/08; B25H 5/00; B33Y 80/00; B33Y 50/02; B29L 2011/768
See application file for complete search history.

(56) References Cited

U.S. PATENT DOCUMENTS

| | | | |
|---|---|---|---|
| 2,476,837 A | 7/1949 | Cline | |
| 2,656,050 A | 10/1953 | Best | |
| 4,893,824 A | 1/1990 | Turek et al. | |
| 5,039,123 A | 8/1991 | Smeitink | |
| 11,084,164 B2 * | 8/2021 | Cook | ........................ B25H 5/00 |
| 2020/0262050 A1 | 8/2020 | Cook | |

* cited by examiner

*Primary Examiner* — James A English
*Assistant Examiner* — James J Triggs
(74) *Attorney, Agent, or Firm* — McDonnell Boehnen Hulbert & Berghoff LLP (57) ABSTRACT

The present disclosure provides a device to assist in confined space entry. The device includes a housing including a top surface, a bottom surface opposite the top surface, a first end positioned between the top surface and the bottom surface, and a second end opposite the first end and positioned between the top surface and the bottom surface. The device also includes a channel in the housing extending from the bottom surface in a direction towards the top surface, wherein the channel is between the first end and the second end. The device also includes a first roller rotatably coupled to the first end of the housing via a first pin, and a second roller rotatably coupled to the second end of the housing via a second pin.

20 Claims, 8 Drawing Sheets

DEVICES AND METHODS FOR PASSING AN ITEM THROUGH AN OPENING

CROSS-REFERENCE TO RELATED APPLICATION

The present disclosure claims priority to and is a divisional of U.S. application Ser. No. 16/281,017, filed on Feb. 20, 2019, the entire disclosure of which is herein incorporated by reference.

FIELD

The present disclosure relates generally to a confined space entry assistance device, and more particularly, to a device to assist with entering and exiting confined spaces through small access holes.

BACKGROUND

Traditionally, in the course of manufacturing an aircraft, workers frequently have to climb through small access holes to access various confined space areas on the aircraft. In some areas, a worker must crawl through two to three of these holes each and every time the worker moves to a new location. The edges of such access holes are typically sharp, ninety degree angles. Given the relatively small thickness of the skin of the aircraft, these edges may be painful to climb through when the body weight of the worker rests on the edge when maneuvering through the access hole. In addition, the sharp edges can cause clothing and personal protective equipment to get caught on them when climbing through, making the traversal of the access holes even more difficult. An existing solution to this is to place a small strip of foam around the edge of the access hole to protect workers from the sharp edges. However, the foam regularly gets knocked off and further does not assist a person in the task of entering the access hole. As such, an improved device for entering such access holes may be desired.

SUMMARY

In one aspect, the present disclosure provides a device. The device includes a housing including a top surface, a bottom surface opposite the top surface, a first end positioned between the top surface and the bottom surface, and a second end opposite the first end and positioned between the top surface and the bottom surface. The device also includes a channel in the housing extending from the bottom surface in a direction towards the top surface, wherein the channel is between the first end and the second end, a first roller rotatably coupled to the first end of the housing via a first pin, and a second roller rotatably coupled to the second end of the housing via a second pin.

In another aspect, the present disclosure provides a non-transitory computer-readable medium having stored thereon programming instructions, that when executed by one or more processors, cause an additive manufacturing machine to create one or more components of a device comprising (a) a housing including a top surface, a bottom surface opposite the top surface, a first end positioned between the top surface and the bottom surface, and a second end opposite the first end and positioned between the top surface and the bottom surface, (b) a channel in the housing extending from the bottom surface in a direction towards the top surface, wherein the channel is between the first end and the second end, (c) a first roller rotatably coupled to the first end of the housing via a first pin, and (d) a second roller rotatably coupled to the second end of the housing via a second pin.

In yet another aspect, the present disclosure provides a method for passing an item through an opening. The method includes positioning a device onto an edge of the opening, wherein the device comprises (a) a housing including a top surface, a bottom surface opposite the top surface, a first end positioned between the top surface and the bottom surface, and a second end opposite the first end and positioned between the top surface and the bottom surface, (b) a channel in the housing extending from the bottom surface in a direction towards the top surface, wherein the channel is between the first end and the second end, (c) a first roller rotatably coupled to the first end of the housing via a first pin, and (d) a second roller rotatably coupled to the second end of the housing via a second pin. The method also includes positioning the item onto the first roller. The method also includes moving the item in a direction towards the second roller.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

The examples described herein provide a device to assist in confined space entry, and methods of manufacturing and use thereof. More specifically the example device described herein provides a housing including a channel that is configured to be positioned on the edge of a confined space entry access hole. The device also includes a first roller rotatably coupled to a first end of the housing via a first pin on an entry side of the access hole, and a second roller rotatably coupled to a second end of the housing via a second pin on an exit side of the access hole. The benefit of the device described herein over the existing solution is that the device creates a surface with a thickness to support the worker when climbing through the access hole, thereby eliminating (and protecting) the sharp edge of the access hole. Further, the rollers on the entry and exit sides of the access hole are an extension of the support surface to assist a worker in pulling themselves through the access hole by rolling to allow the worker to slide through without getting caught on any sharp edges or the aircraft skin. The device not only protects a worker from the sharp edge of the access hole, but also disperses their weight, protects the aircraft, and makes navigating through these access holes easier through the implementation of the rollers for assistance. As such, the device described herein serves a dual purpose of protecting both people and the aircraft.

Various other features of the example device discussed above, as well as methods for manufacturing and using the example device, are also described hereinafter with reference to the accompanying figures. While the focus of the disclosure is on entry and exit of circular access holes in a skin of an aircraft when manufacturing the aircraft, the device and methods described herein may be used on any shaped opening in any environment where an item or individual needs assistance in traversing the opening. Illustrative, non-exhaustive examples, which may or may not be claimed, of the subject matter according the present disclosure are provided below.

Figure 1:
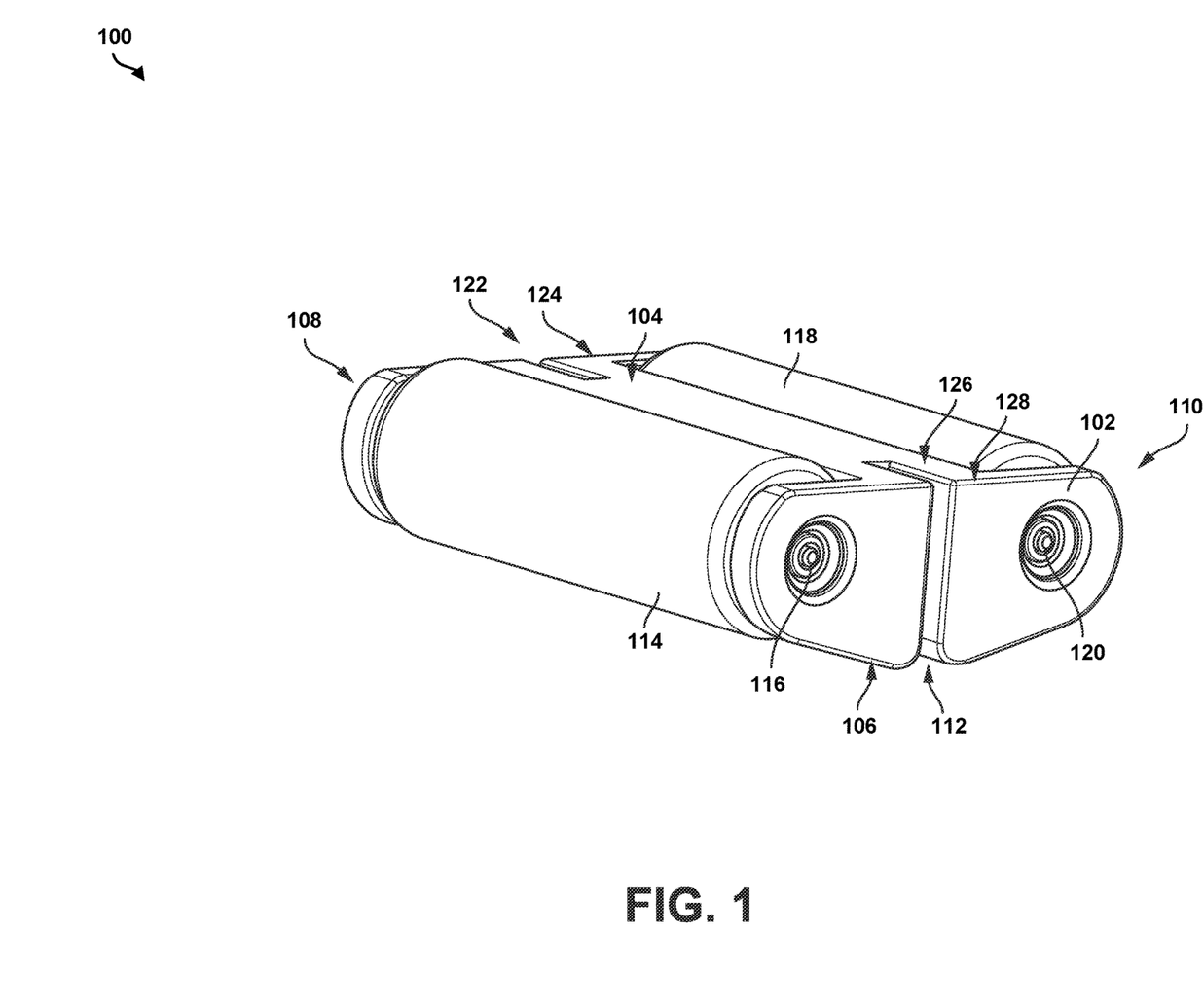
FIG. 1 is a top perspective view of an example device.
Figure 2:
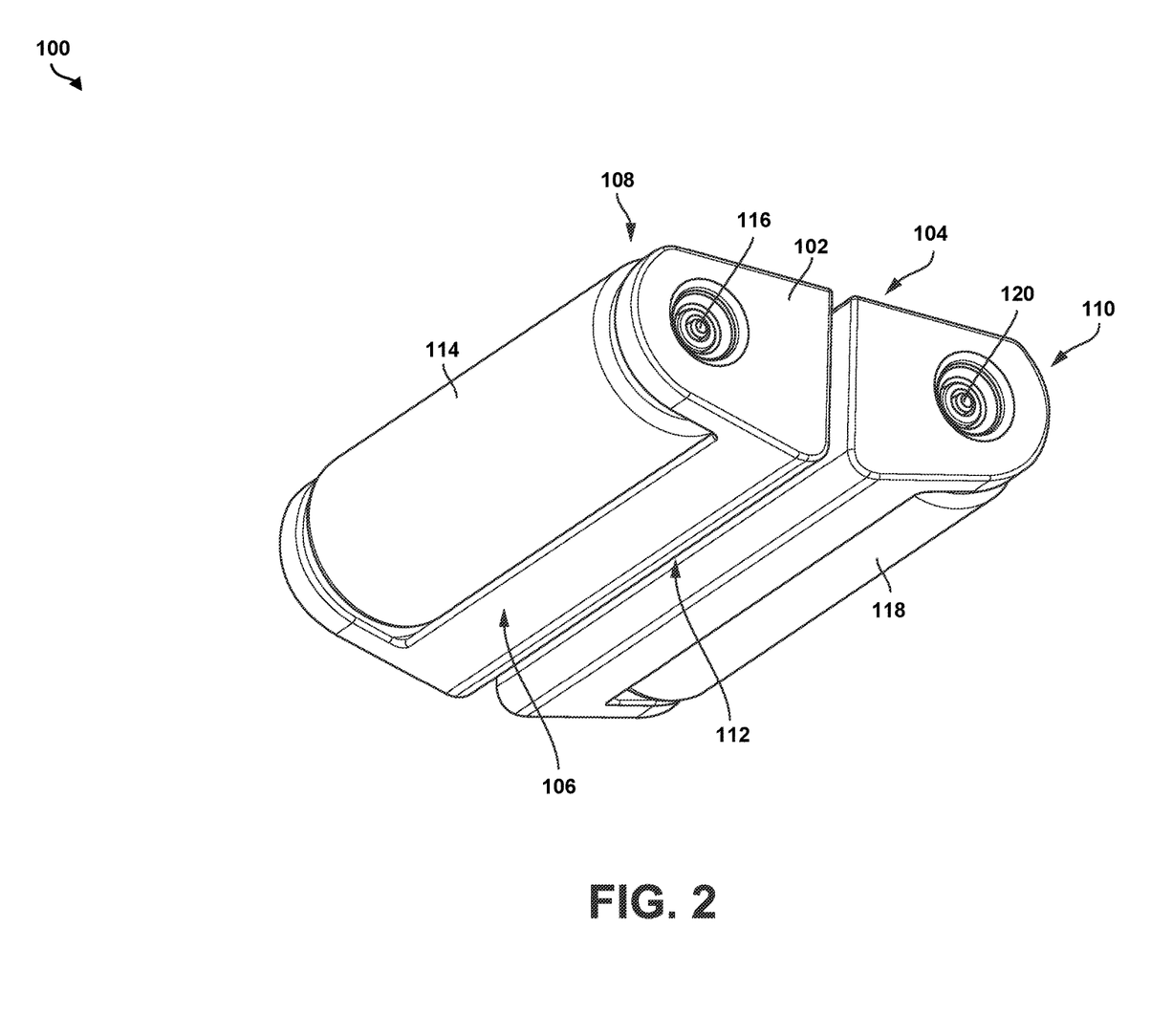
FIG. 2 is a bottom perspective view of the device of FIG. 1.

With reference to the Figures, FIG. 1 illustrates a top perspective view of an example of a device 100 to assist in confined space entry. FIG. 2 illustrates a bottom perspective view of the device 100 shown in FIG. 1. As shown in FIGS. 1 and 2, the device 100 includes a housing 102 including a top surface 104, a bottom surface 106 opposite the top surface 104, a first end 108 positioned between the top surface 104 and the bottom surface 106, and a second end 110 opposite the first end 108 and positioned between the top surface 104 and the bottom surface 106. In one example, the housing 102 may be made from a machinable plastic material such as polyether ether ketone (PEEK), polyethylene (PE), polypropylene (PP), or polyoxymethylene (POM).

As shown in FIGS. 1 and 2, the device 100 also includes a channel 112 in the housing 102 extending from the bottom surface 106 in a direction towards the top surface 104. The channel 112 is positioned between the first end 108 and the second end 110 of the housing 102. In one particular example, the channel 112 is positioned at a midpoint between the first end 108 and the second end 110 of the housing 102. The device 100 also includes a first roller 114 rotatably coupled to the first end 108 of the housing 102 via a first pin 116. The device 100 also includes a second roller 118 rotatably coupled to the second end 110 of the housing 102 via a second pin 120. A longitudinal axis of the first roller 114 may be parallel to a longitudinal axis of the second roller 118, and the channel 112 may be parallel to both the longitudinal axis of the first roller 114 and the longitudinal axis of the second roller 118. In one example, the first roller 114 and the second roller 118 may comprise a high density foam material such as high density Expanded Polypropylene (EPP), Ethylene-Vinyl Acetate (EVA), or Polyethylene-Vinyl Acetate (PEVA) as non-limiting examples.

As shown in FIGS. 1 and 2, the first pin 116 and the second pin 120 may be recessed with respect to the housing 102. Such an arrangement may help prevent clothing of an individual from snagging on the device 100 as the individual passes through the opening 132 (shown in FIG. 3). Further, the first roller 114 and the second roller 118 may be removably coupled to the housing 102 via the first pin 116 and the second pin 120. Such an arrangement enables the first roller 114 and the second roller 118 to be exchanged as they are worn, while an original form of the housing 102 can remain.

As shown in FIG. 1, the device 100 may include a first cutout 122 in the top surface 104 of the housing 102. The first cutout 122 extends inward from a first edge 124 of the housing 102, and the first cutout 122 is connected to the channel 112. The device 100 may further include a second cutout 126 in the top surface 104 of the housing 102. The second cutout 126 extends inward from a second edge 128 of the housing 102, and the second cutout 126 is connected to the channel 112.

Figure 3:
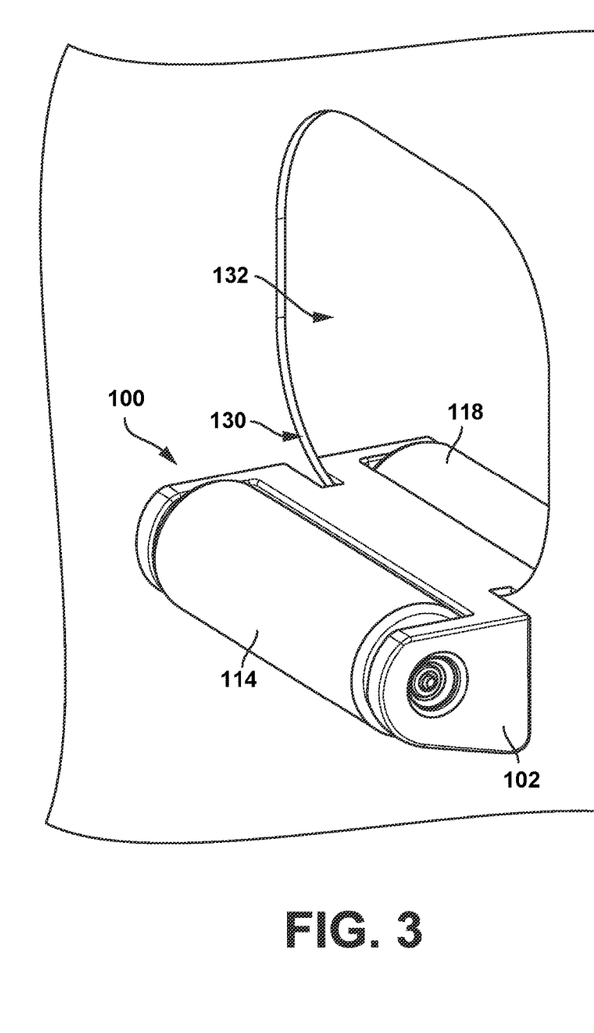
FIG. 3 illustrates the device of FIG. 1 positioned on an edge of an opening.

FIG. 3 illustrates the device 100 of FIG. 1 positioned on an edge 130 of an opening 132. As shown in FIG. 3, when the device 100 is positioned on the edge 130 of the opening 132, the first roller 114 is positioned on a first side of the opening 132 and the second roller 118 is positioned on a second side of the opening 132. The width of the channel 112 may be slightly larger than the thickness of the edge 130 of the opening 132, so as to provide a snug fit when the device 100 is positioned on the edge 130 of the opening 132. In one example, the width of the channel 112 should be no larger than about 0.05 inches greater than the thickness of the edge 130 of the opening. Additionally, additional weight may be added nearer the bottom surface 106 of the housing to provide additional stability to the device 100 when it is positioned on the edge 130 of the opening 132. As further shown in FIG. 3, the first cutout 122 and the second cutout 126 enable a width of the housing 102 to be greater than a minimum width of the opening 132. In one example, the width of the housing is further greater than a maximum width of the opening 132. Such arrangements help to maximize the surface area of the device 100 to help distribute the weight of the individual or item that is passed through the opening 132 when in use.

Figure 4:
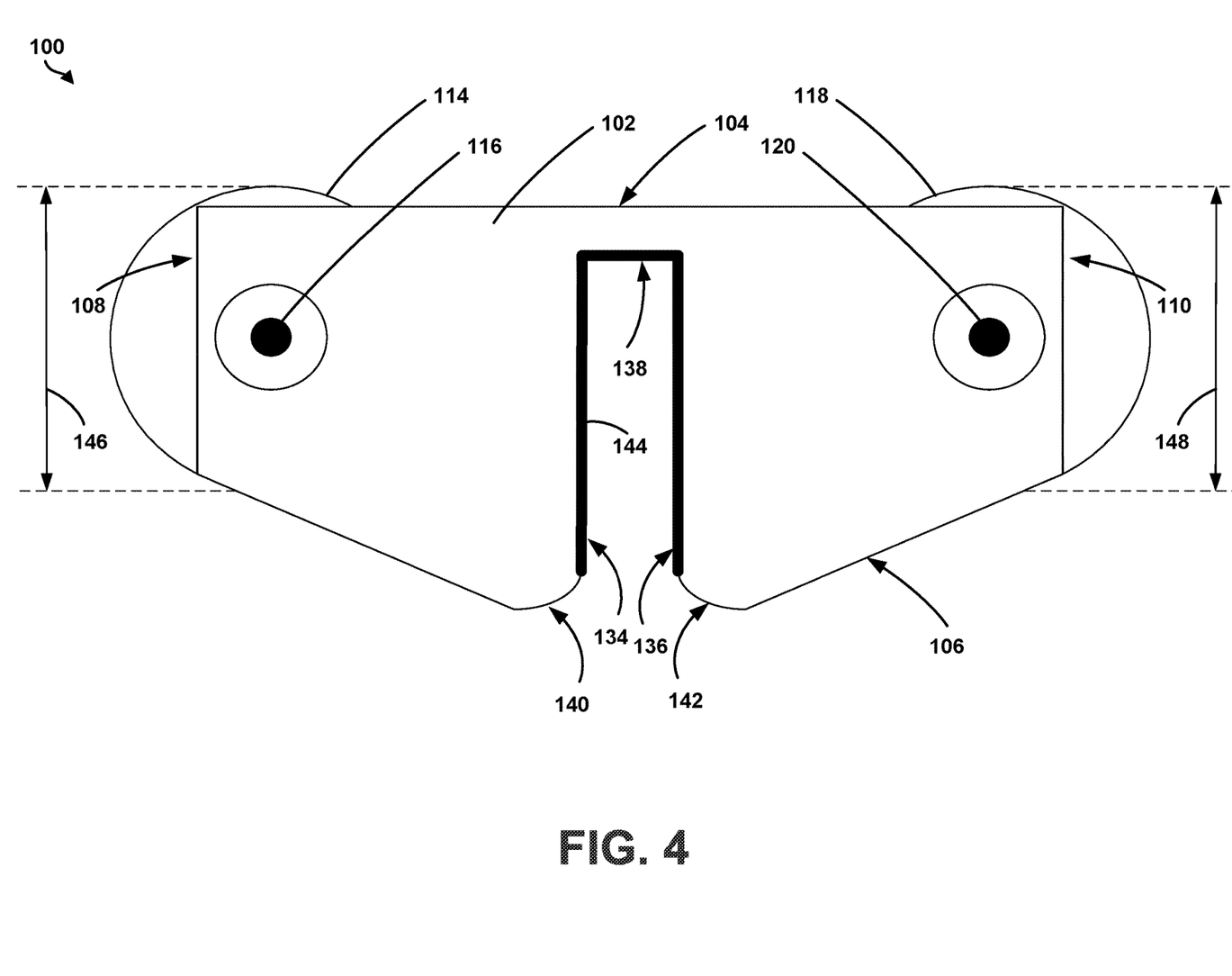
FIG. 4 a side view of the device of FIG. 1.

FIG. 4 illustrates a side view of the device 100 of FIG. 1. As shown in FIG. 4, the channel 112 includes a first sidewall 134, a second sidewall 136 opposite the first sidewall 134, and a contact surface 138 positioned between the first sidewall 134 and the second sidewall 136. At least a portion of the contact surface 138 is parallel to the top surface 104 of the housing 102, and the first sidewall 134 and the second sidewall 136 are both perpendicular to the top surface 104 of the housing 102. In one example, as shown in FIG. 4, the top surface 104 of the housing 102 is substantially flat, and the bottom surface 106 of the housing 102 is angled from the first sidewall 134 of the channel 112 towards the first end 108 of the housing 102 and from the second sidewall 136 of the channel 112 towards the second end 110 of the housing 102. In particular, as shown in FIG. 4, in such an example the thickness of the housing 102 increases towards the middle, and decreases towards the first end 108 and the second end 110. Such an arrangement may reduce the amount of material needed to form the housing 102, thus reducing manufacturing cost of the device 100.

In one example, as shown in FIG. 4, the bottom surface 106 includes a first radius of curvature 140 between the first sidewall 134 and the bottom surface 106, and the bottom surface 106 includes a second radius of curvature 142 between the second sidewall 136 and the bottom surface 106. The first radius of curvature 140 and the second radius of curvature 142 may be equal, or they may be different radii of curvature. Such an arrangement may assist a user in positioning the channel 112 of the device 100 onto the edge 130 of the opening 132 when in use.

In another example, as shown in FIG. 4, a foam material 144 may be positioned in the channel 112 on one or more of the first sidewall 134, the second sidewall 136, and the contact surface 138. The foam material 144 may help protect the edge 130 of the opening 132 onto which the device 100 is positioned when in use. In addition, the foam material 144 may be compressible to thereby enable openings through different materials having varying thicknesses to work with a single of the device 100. As shown in FIG. 4, in one example a height 146 of the first roller 114 and a height 148 of the second roller 118 extend above the top surface 104 of the housing 102. Such an arrangement can help ensure that an individual or item that is passed through the opening 132 contacts the first roller 114 and the second roller 118 to thereby assist the individual or item passing through the opening 132.

In one example, the height 146 of the first roller 114 is equal to the height 148 of the second roller 118. Such an arrangement provides an equal assistance in moving an individual or item through the opening 132 regardless of the direction the individual or item is passing through the opening 132. In another example, the height 146 of the first roller 114 is different than the height 148 of the second roller 118. Such an arrangement provides an angled plane between the top of the first roller 114 and the top of the second roller 118, which provides improved assistance in moving an individual or item through the opening 132 in one direction compared to the other direction. For example, if the height 146 of the first roller 114 is greater than the height 148 of the second roller 118, it would be easier to move an individual or item in a direction from the first roller 114 towards the second roller 118. Conversely, if the height 146 of the first roller 114 is less than the height 148 of the second roller 118, it would be easier to move an individual or item in a direction from the second roller 118 towards the first roller 114. Further, as shown in FIG. 4, a width of the first roller 114 extends past the first end 108 of the housing 102, and a width of the second roller 118 extends past the second end 110 of the housing 102. Such an arrangement may help prevent clothing of an individual from snagging on the device 100 as the individual passes through the opening 132.

Figure 5:
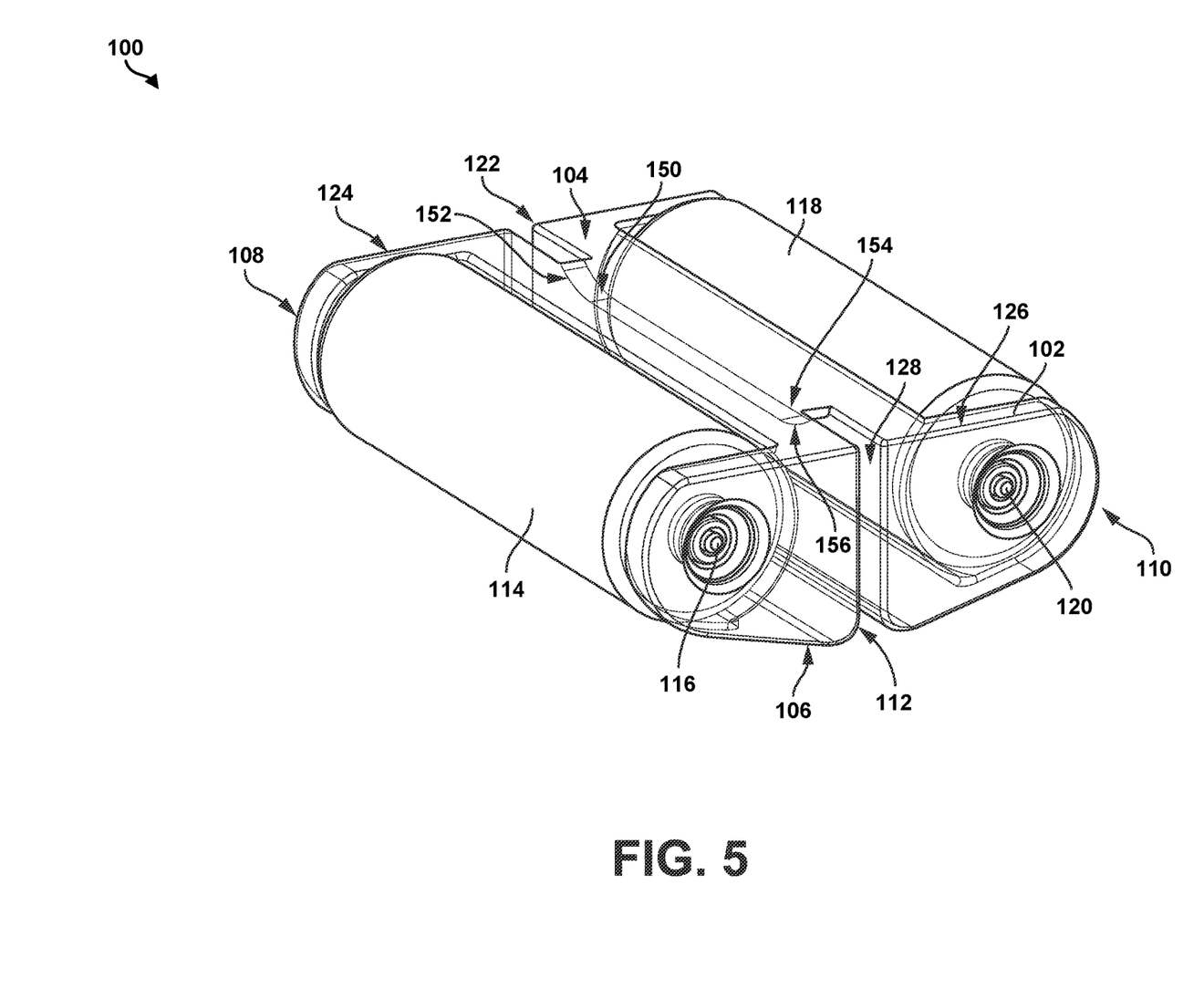
FIG. 5 is a top perspective view of the device of FIG. 1 with the housing shown transparent.

In one example, the contact surface 138 in the channel 112 is substantially flat along its length. In another example, at least a portion of the contact surface 138 in the channel 112 includes a radius of curvature. FIG. 5 illustrates a top perspective view of the device 100 of FIG. 1, with the housing 102 shown transparent. In one particular example, as shown in FIG. 5, the contact surface 138 includes a first portion 150 having a first radius of curvature 152, and a second portion 154 having a second radius of curvature 156. The first portion 150 and the second portion 154 of the contact surface 138 may comprise the opposite ends of the contact surface 138, as shown in FIG. 5. Such an arrangement may provide additional contact between the contact surface 138 and the edge 130 of the opening 132 on which the device 100 is positioned when the opening is circular. The first radius of curvature 152 of the first portion 150 of the contact surface 138 and the second radius of curvature 156 of the second portion 154 of the contact surface 138 may be equal, or they may be different radii of curvature.

Figure 6:
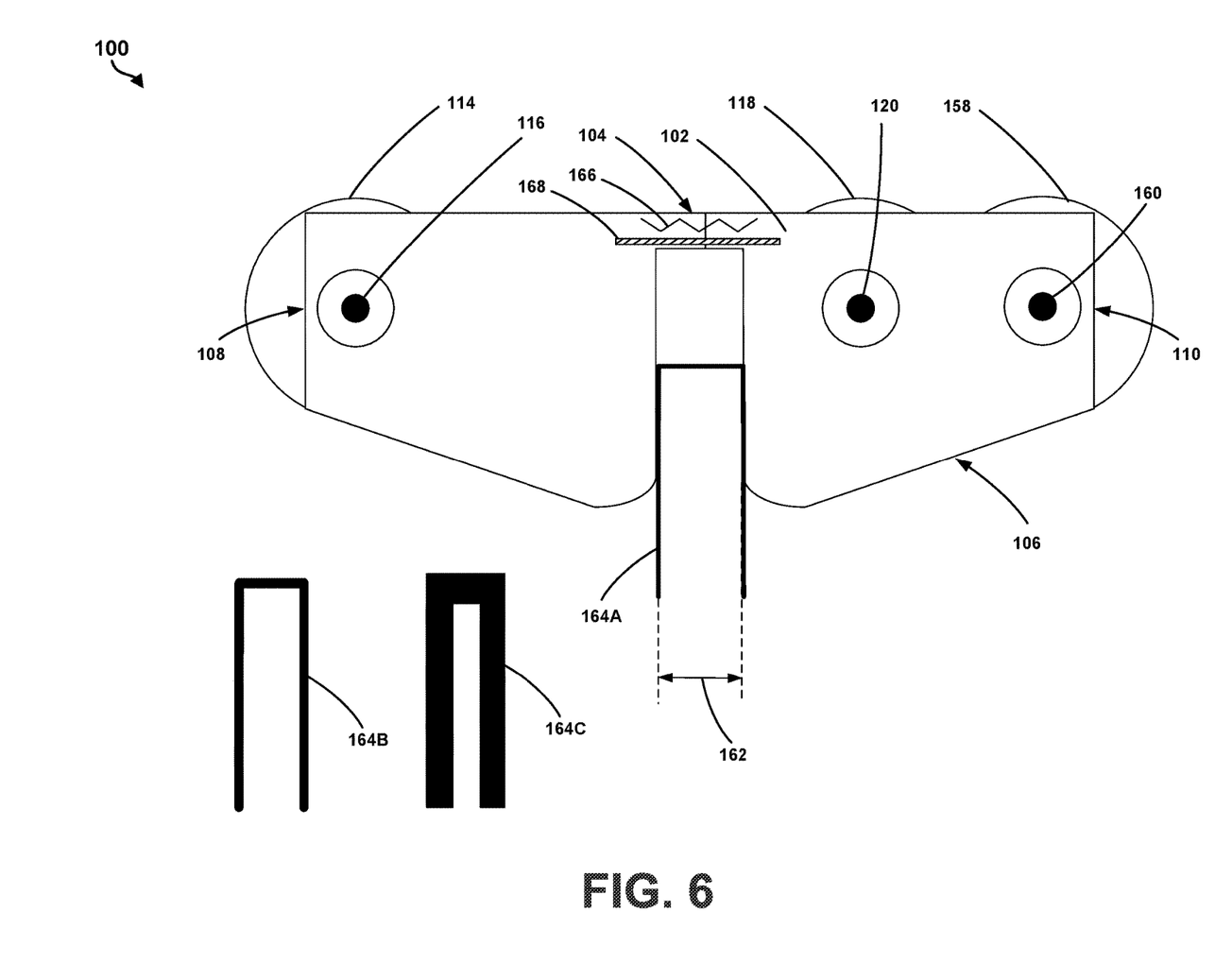
FIG. 6 is a side view of another example device.

FIG. 6 illustrates a side view of another example embodiment of the device 100. In particular, as shown in FIG. 6, the device 100 may further include a third roller 158 rotatably coupled to the second end 110 of the housing 102 via a third pin 160. The second roller 118 is positioned between the first roller 114 and the third roller 158. Additional rollers can be added to the second end 110 of the housing 102 of the device 100 and/or the first end 108 of the housing 102 of the device 100 to create a ramp on either side of the opening 132 to further assist in passing an individual or item through the opening 132.

In another example, a width 162 of the channel 112 may be adjustable. In one particular example, as shown in FIG. 6, the device 100 may include one or more inserts 164A-164C removably positioned within the channel 112 to thereby adjust the width 162 of the channel. Insert 164A is shown being inserted into the channel 112 in FIG. 6. In addition to each of the one or more inserts 164A-164C having a different width, the one or more inserts 164A-164C may comprise different shape profiles to accommodate different shaped openings for the opening 132. For example, the device 100 may use one insert of the one or more inserts 164A-164C in the channel 112 for a circular opening, and the device 100 may use a different insert of the one or more inserts 164A-164C in the channel 112 for a square opening.

In another example, the first end 108 of the housing 102 may be moveable with respect to the second end 110 of the housing 102 to thereby adjust the width 162 of the channel 112. In such an example, the housing 102 is not an integral unit but rather two components coupled together via a mechanism that causes the first end 108 of the housing 102 to move with respect to the second end 110 of the housing 102 to thereby enable the width 162 of the channel 112 to be adjusted by a user. For example, the device 100 may include a spring 166 that biases the channel 112 to a closed position such that the first end 108 of the housing 102 is biased in a direction towards the second end 110 of the housing 102. In another example, the device 100 may include a worm drive 168 that a user can turn to move the first end 108 of the housing 102 away from or towards the second end 110 of the housing 102 to thereby increase or decrease the width 162 of the channel 112. Other mechanisms are possible as well.

In some examples, such as shown in any one of FIGS. 1-6, one or more components of the device 100 is made via an additive manufacturing process using an additive-manufacturing machine, such as stereolithography, multi-jet modeling, inkjet printing, selective laser sintering/melting, and fused filament fabrication, among other possibilities. Additive manufacturing enables one or more components of the device 100 and other physical objects to be created as intraconnected single-piece structure through the use of a layer-upon-layer generation process. Additive manufacturing involves depositing a physical object in one or more selected materials based on a design of the object. For example, additive manufacturing can generate one or more components of the device 100 using a Computer Aided Design (CAD) of the device 100 as instructions. As a result, changes to the design of the device 100 can be immediately carried out in subsequent physical creations of the device 100. This enables the components of the device 100 to be easily adjusted or scaled to fit different types of applications (e.g., for use in various confined space entry openings).

The layer-upon-layer process utilized in additive manufacturing can deposit one or more components of the device 100 with complex designs that might not be possible for devices assembled with traditional manufacturing. In turn, the design of the device 100 can include aspects that aim to improve overall operation. For example, the design can incorporate physical elements that help redirect stresses in a desired manner that traditionally manufactured devices might not be able to replicate.

Additive manufacturing also enables depositing one or more components of the device 100 in a variety of materials using a multi-material additive-manufacturing process. In such an example, the housing 102 may be made from a first material and the first roller 114 and the second roller 118 may be made from a second material that is different than the first material. In one particular example, the first material comprises a plastic such as polyether ether ketone (PEEK), polyethylene (PE), polypropylene (PP), or polyoxymethylene (POM), and the second material comprises a high density foam such as high density Expanded Polypropylene (EPP), Ethylene-Vinyl Acetate (EVA), or Polyethylene-Vinyl Acetate (PEVA) as non-limiting examples. In another example, both the housing 102 and the first roller 114 and the second roller 118 are made from the same material. Other example material combinations are possible as well. Further, one or more components of the device 100 can have some layers that are created using a first type of material and other layers that are created using a second type of material. In addition, various processes are used in other examples to produce one or more components of the device 100. These processes are included in table 1 below.

TABLE 1

| | |
|---|---|
| DEP | Direct Energy Deposition |
| DMLS | Direct Metal Laser Sintering |
| DMP | Direct Metal Printing |
| EBAM | Electron Beam Additive Manufacturing |
| EBM | Electron Beam Leting |
| EBPD | Electron Beam Powder Bed |
| FDM | Fused Deposition Modeling |
| IPD | Indirect Power Bed |
| LCT | Laser Cladding Technology |
| LDT | Laser Deposition Technology |
| LDW | Laser Deposition Welding |
| LDWM | Laser Deposition Welding with integrated Milling |
| LENS | Laser Engineering Net Shape |
| LFMT | Laser Freeform Manufacturing Technology |
| LMD-p | Laser Metal Deposition-powder |
| LMD-w | Laser Metal Deposition-wire |
| LPB | Laser Powder Bed |
| LPD | Laser Puddle Deposition |
| LRT | Laser Repair Technology |
| PDED | Powder Directed Energy Deposition |
| SLA | Stereolithography |
| SLM | Selective Laser Melting |
| SLS | Selective Laser Sintering |
| SPD | Small Puddle Deposition |

In some example implementations, one or more components of the device 100 are generated using melt-away support materials, such as sulfone, thermoplastic, polyester, organic composite photoresist materials, and dry film resists. Particularly, during the layer-upon-layer generation process, a melt-away support material can support one or more components of the device 100 until the one or more components of the device 100 is complete and stable enough to standalone. In turn, the melt-away support material can support physical aspects of the device 100 during the layer-upon-layer generation process until the device 100 is completed. After the one or more components of the device 100 are completed, the melt-away support material can be removed to leave only the finished components remaining. For instance, a water soluble melt-away support material can rinse away from portions of device 100.

Figure 7:
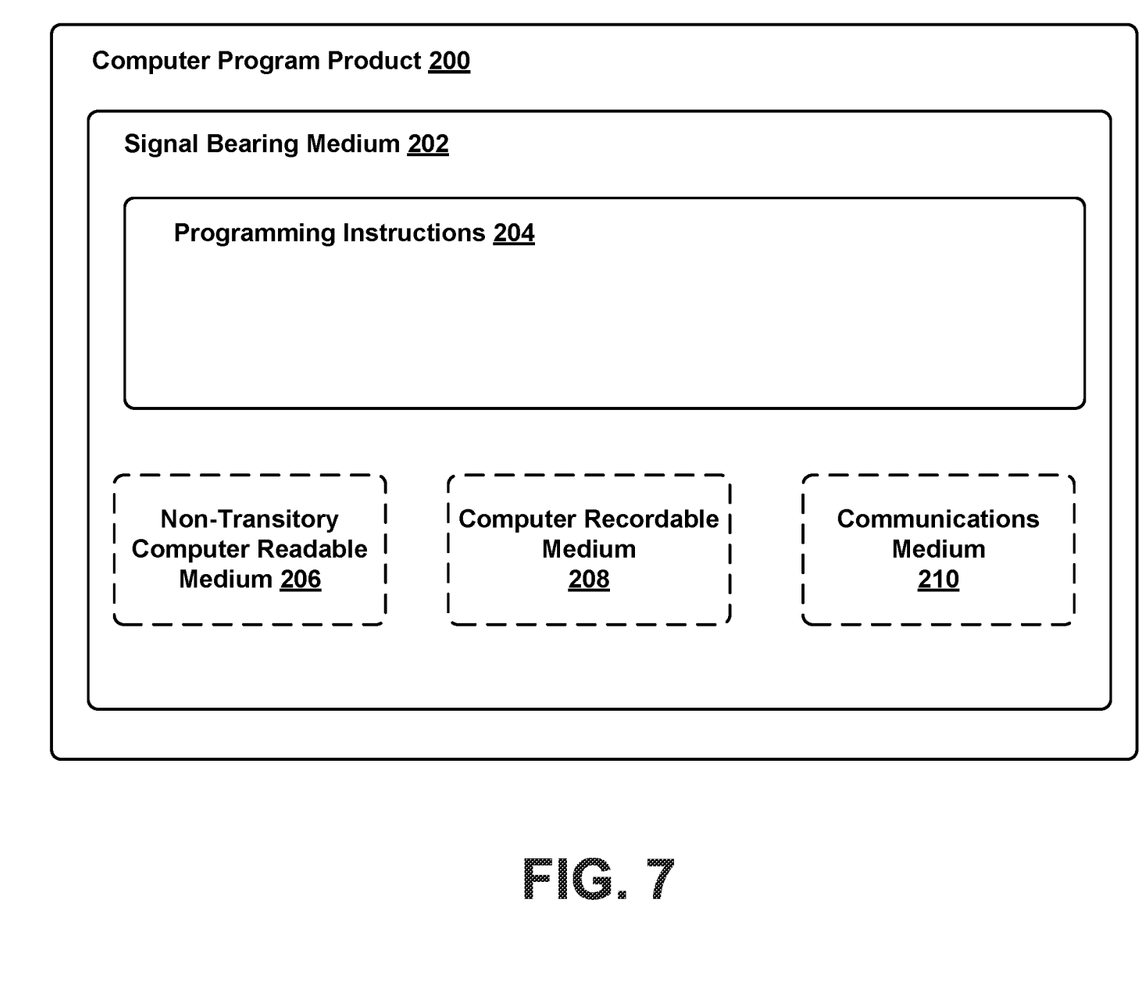
FIG. 7 is an example computer-readable medium configured according to an example implementation to cause an additive manufacturing machine to create one or more components of the device of FIGS. 1-6.

The additive-manufacturing machines and/or processes described above may be controlled by non-transitory computer-readable medium. FIG. 7 depicts an example non-transitory computer-readable medium configured according to an example implementation. In example implementations, the system may include one or more processors, one or more forms of memory, one or more input devices/interfaces, one or more output devices/interfaces, and machine readable instructions that, when executed by the one or more processors, cause an additive manufacturing machine to create one or more components of the device 100 of any of the examples described above with respect to FIGS. 1-6.

In one implementation, the example computer program product 200 is provided using a signal bearing medium 202. The signal bearing medium 202 may include one or more programming instructions 204 that, when executed by one or more processors may cause an additive manufacturing machine to create one or more components of the device 100 of any of the embodiments described above with respect to FIGS. 1-6. In some examples, the signal bearing medium 202 may be a non-transitory computer-readable medium 206, such as, but not limited to, a hard disk drive, a Compact Disc (CD), a Digital Video Disk (DVD), a digital tape, memory, etc. In some implementations, the signal bearing medium 202 may be a computer recordable medium 208, such as, but not limited to, memory, read/write (R/W) CDs, R/W DVDs, etc. In some implementations, the signal bearing medium 202 may be a communications medium 210 (e.g., a fiber optic cable, a waveguide, a wired communications link, etc.). Thus, for example, the signal bearing medium 202 may be conveyed by a wireless form of the communications medium 210.

The one or more programming instructions 204 may be, for example, computer executable and/or logic implemented instructions. In some examples, a computing device may be configured to provide various operations, functions, or actions in response to the programming instructions 204 conveyed to the computing device by one or more of the non-transitory computer-readable medium 206, the computer recordable medium 208, and/or the communications medium 210.

The non-transitory computer-readable medium 206 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be a remotely located computer system, such as a server.

Figure 8:
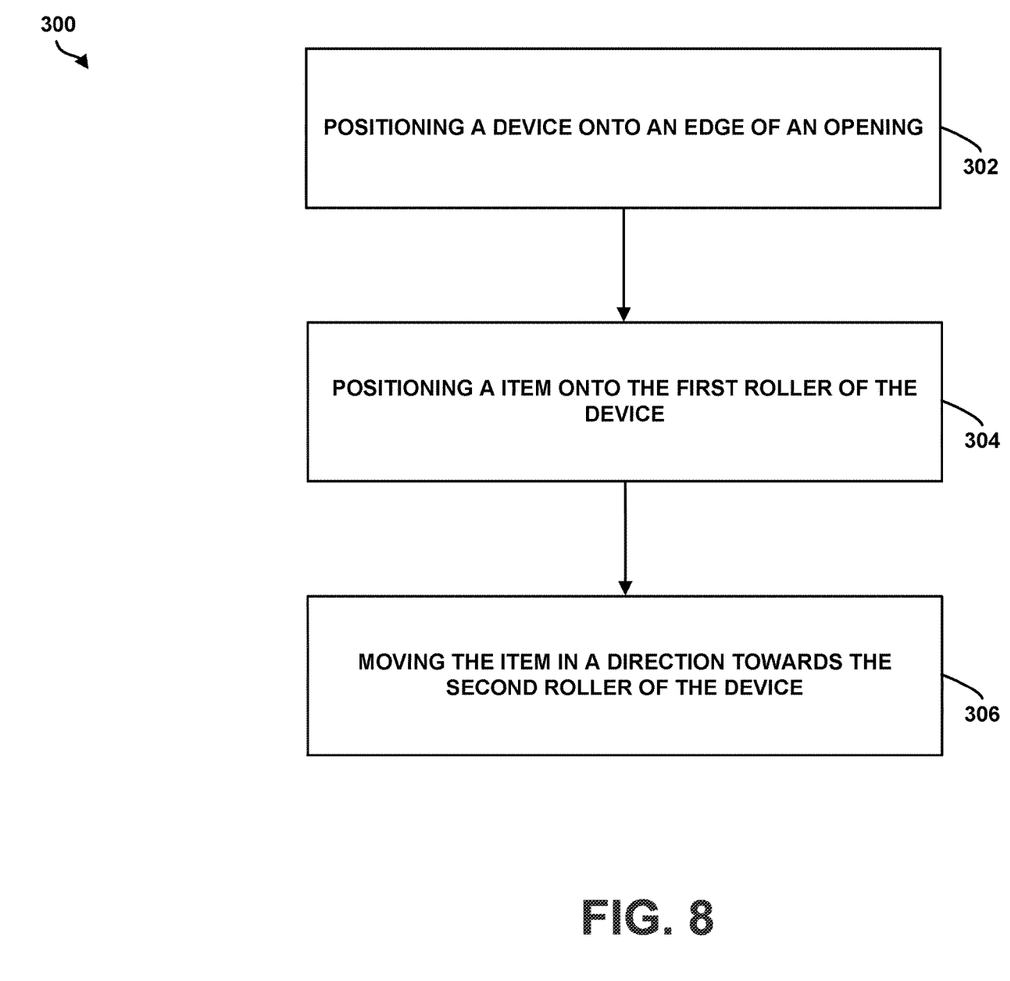
FIG. 8 is a flowchart of a method for passing an item through an opening using the device of FIGS. 1-6.

FIG. 8 is a block diagram of an example of a method 300 for passing an item through an opening. Method 300 shown in FIG. 8 presents an embodiment of a method that could be carried out using the device 100 of FIGS. 1-6, as an example. Method 300 includes one or more operations, functions, or actions as illustrated by one or more of blocks 302-306. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 302, the method 300 includes positioning a device 100 onto an edge 130 of the opening 132. The device 100 comprises the device 100 of any of the embodiments described above with respect to FIGS. 1-6. At block 304, the method 300 includes positioning the item onto the first roller 114. At block 306, the method 300 includes moving the item in a direction towards the second roller 118. As discussed above, the item may be an individual or an inanimate object. In one example, positioning the device 100 onto the edge 130 of the opening 132 comprises positioning the channel 112 of the device 100 over the edge 130 of the opening 132 until a contact surface 138 of the channel 112 contacts the edge 130 of the opening 132.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts were described in conjunction with specific examples, it will be understood that these examples are not intended to be limiting.

In FIG. 8, referred to above, the blocks may represent operations and/or portions thereof and lines connecting the various blocks do not imply any particular order or dependency of the operations or portions thereof. It will be understood that not all dependencies among the various disclosed operations are necessarily represented. FIG. 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means +/−5%.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A non-transitory computer-readable medium having stored thereon programming instructions, that when executed by one or more processors, cause an additive manufacturing machine to create one or more components of a device comprising (a) a housing including a top surface, a bottom surface opposite the top surface, a first end positioned between the top surface and the bottom surface, and a second end opposite the first end and positioned between the top surface and the bottom surface, (b) a channel in the housing extending from the bottom surface in a direction towards the top surface, wherein the channel is between the first end and the second end, (c) a first roller rotatably coupled to the first end of the housing via a first pin, and (d) a second roller rotatably coupled to the second end of the housing via a second pin.

2. The non-transitory computer-readable medium of claim 1, wherein a width of the first roller extends past the first end of the housing, and wherein a width of the second roller extends past the second end of the housing.

3. The non-transitory computer-readable medium of claim 1, wherein the channel includes a first sidewall, a second sidewall opposite the first sidewall, and a contact surface positioned between the first sidewall and the second sidewall, wherein at least a portion of the contact surface is parallel to the top surface of the housing, and wherein the first sidewall and the second sidewall are both perpendicular to the top surface of the housing.

4. The non-transitory computer-readable medium of claim 3, wherein the top surface of the housing is flat, and wherein the bottom surface of the housing is angled from the first sidewall of the channel towards the first end of the housing and from the second sidewall of the channel towards the second end of the housing.

5. The non-transitory computer-readable medium of claim 3, wherein the bottom surface includes a first radius of curvature between the first sidewall and the bottom surface, and wherein the bottom surface includes a second radius of curvature between the second sidewall and the bottom surface.

6. The non-transitory computer-readable medium of claim 1, wherein a height of the first roller and a height of the second roller extends above the top surface of the housing.

7. The non-transitory computer-readable medium of claim 1, wherein a height of the first roller is equal to a height of the second roller.

8. The non-transitory computer-readable medium of claim 1, wherein a height of the first roller is different than a height of the second roller.

9. The non-transitory computer-readable medium of claim 1, wherein the first roller is removably coupled to the first end of the housing, and wherein the second roller is removably coupled to the second end of the housing.

10. The non-transitory computer-readable medium of claim 1, wherein a longitudinal axis of the first roller is parallel to a longitudinal axis of the second roller, and wherein the channel is parallel to both the longitudinal axis of the first roller and the longitudinal axis of the second roller.

11. A method for passing an item through an opening, the method comprising:
- positioning a device onto an edge of the opening, wherein the device comprises (a) a housing including a top surface, a bottom surface opposite the top surface, a first end positioned between the top surface and the bottom surface, and a second end opposite the first end and positioned between the top surface and the bottom surface, (b) a channel in the housing extending from the bottom surface in a direction towards the top surface, wherein the channel is between the first end and the second end, (c) a first roller rotatably coupled to the first end of the housing via a first pin, and (d) a second roller rotatably coupled to the second end of the housing via a second pin;
- positioning the item onto the first roller; and
- moving the item in a direction towards the second roller.

12. The method of claim 11, wherein positioning the device onto the edge of the opening comprises positioning the channel of the device over the edge of the opening until a contact surface of the channel contacts the edge of the opening.

13. The method of claim 11, wherein positioning the device onto the edge of the opening comprises positioning the first end of the housing on an entry side of the opening and positioning the second end of the housing on an exit side of the opening.

14. The method of claim 11, wherein a width of the first roller extends past the first end of the housing, and wherein a width of the second roller extends past the second end of the housing.

15. The method of claim 11, wherein the channel includes a first sidewall, a second sidewall opposite the first sidewall, and a contact surface positioned between the first sidewall and the second sidewall, wherein at least a portion of the contact surface is parallel to the top surface of the housing, and wherein the first sidewall and the second sidewall are both perpendicular to the top surface of the housing, and
- wherein positioning the device onto the edge of the opening comprises positioning the channel of the device over the edge of the opening until the contact surface of the channel contacts the edge of the opening.

16. The method of claim 15, wherein the method comprises:
- positioning a foam material in the channel on one or more of the first sidewall, the second sidewall, and the contact surface.

17. The method of claim 11, wherein the method comprises:
- removably coupling the first roller to the first end of the housing; and
- removably coupling the second roller to the second end of the housing.

18. The method of claim 11, wherein the method comprises:
- providing a longitudinal axis of the first roller parallel to a longitudinal axis of the second roller.

19. The method of claim 18, wherein the method comprises:
- providing the channel parallel to both the longitudinal axis of the first roller and the longitudinal axis of the second roller.

20. The method of claim 11, wherein positioning the device onto the edge of the opening comprises positioning the device comprising a third roller rotatably coupled to the second end of the housing via a third pin, wherein the second roller is positioned between the first roller and the third roller.

* * * * *